United States Patent [19]
Duck et al.

[11] Patent Number: 6,044,187
[45] Date of Patent: Mar. 28, 2000

[54] MULTI-PORT FIBER OPTICAL DEVICE

[76] Inventors: Gary S. Duck, 6 Barcham Crescent, Nepean, Canada, K2J 3Z7; Neil Teitelbaum, 834 Colonel By Drive, Ottawa, Canada, K1S 5C4; Yihao Cheng, 36 Meadowbreeze Drive, Kanata, Canada, K2M 2L6; Vincent Delisle, 1375 Prince of Wales Drive, Apt 1010, Ottawa, Canada, K2C 3L5

[21] Appl. No.: 09/052,879

[22] Filed: Apr. 1, 1998

[51] Int. Cl.[7] .................................................. G02B 6/32
[52] U.S. Cl. ............................................................ 385/33
[58] Field of Search ................................. 385/24, 31, 33, 385/34, 35, 39; 359/642, 362

[56] References Cited

U.S. PATENT DOCUMENTS

| | | | |
|---|---|---|---|
| 4,111,524 | 9/1978 | Tomlinson, III | 350/96.19 |
| 4,299,488 | 11/1981 | Tomlinson, III | 356/328 |
| 5,050,954 | 9/1991 | Gardener et al. | 385/16 |
| 5,287,424 | 2/1994 | Anderson | 385/39 |
| 5,930,418 | 7/1990 | Chang | 385/24 |

FOREIGN PATENT DOCUMENTS

| | | | |
|---|---|---|---|
| 0 194 612 | 3/1986 | European Pat. Off. | G02B 6/34 |
| 0 722 101 A1 | 11/1995 | European Pat. Off. | G02B 6/26 |
| 2 551 886 | 9/1983 | France | G02B 6/26 |
| 01178903 | 7/1989 | Japan | G02B 6/28 |

*Primary Examiner*—Akm E. Ullah
*Attorney, Agent, or Firm*—Neil Teitelbaum & Associates

[57] ABSTRACT

A useful device is provided for coupling or splitting optical signals from one port to another. The symmetry of a lens is utilized in a manner whereby two linear arrays of optical ports are disposed adjacent the optical axis of the lens equidistant from the optical axis of the lens. An at least partially reflecting optical element is disposed at a collimating end of the lens. Signals launched into one array of ports reflects back to the second array of ports at the same end. In another embodiment of the invention utilizing these two linear arrays of waveguides, two matched lenses having an element disposed between are used as a coupler/splitter. In this arrangement ports are positioned on opposite sides of the optical axis equidistant from it.

14 Claims, 10 Drawing Sheets

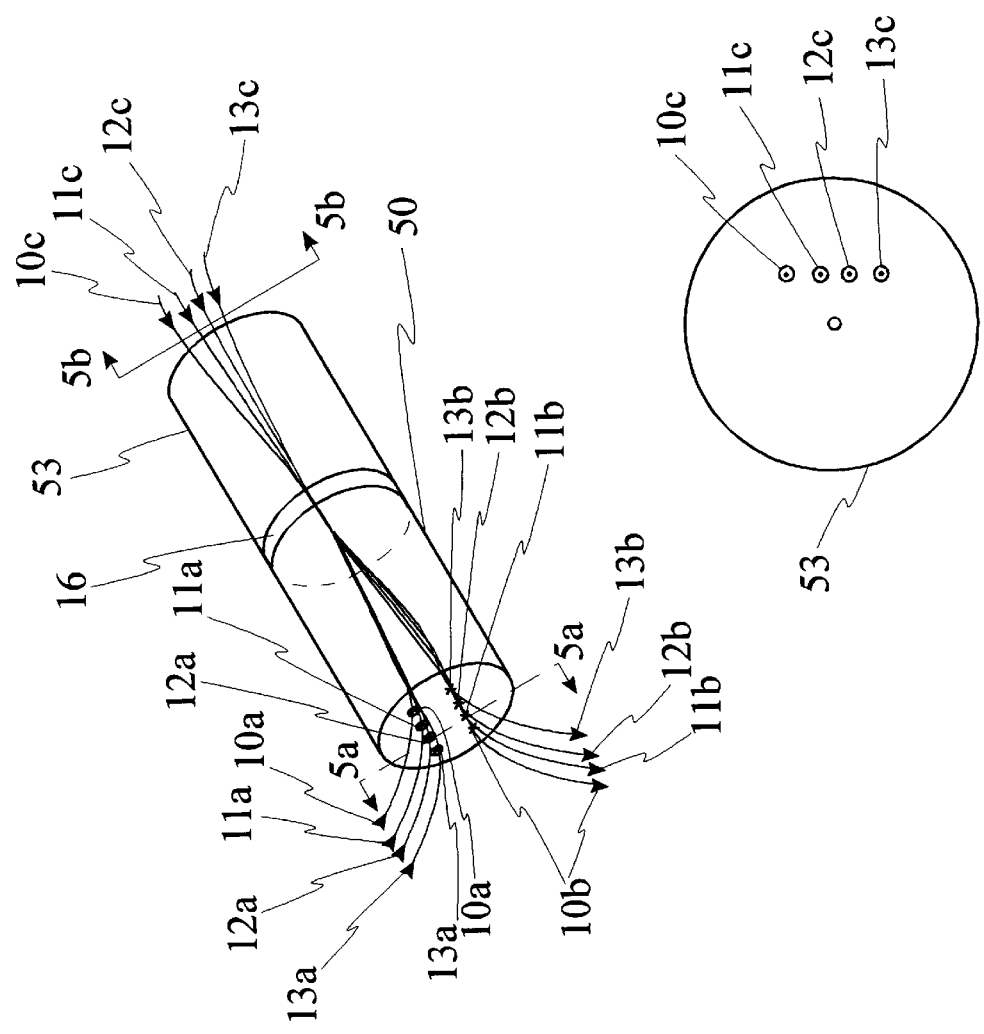
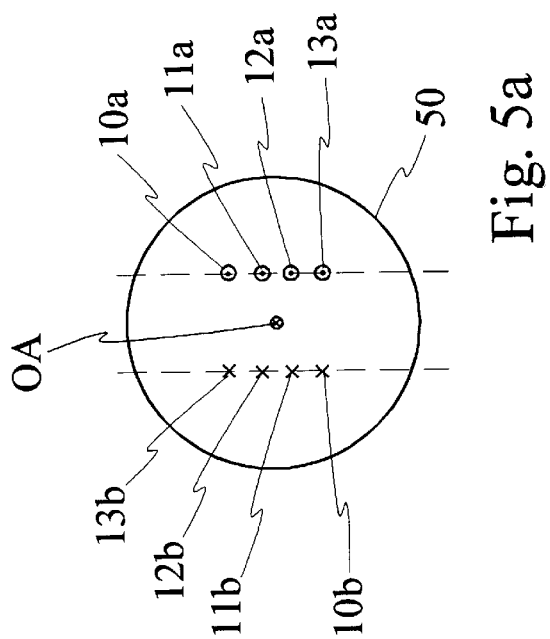
Fig. 5
Fig. 5a
Fig. 5b

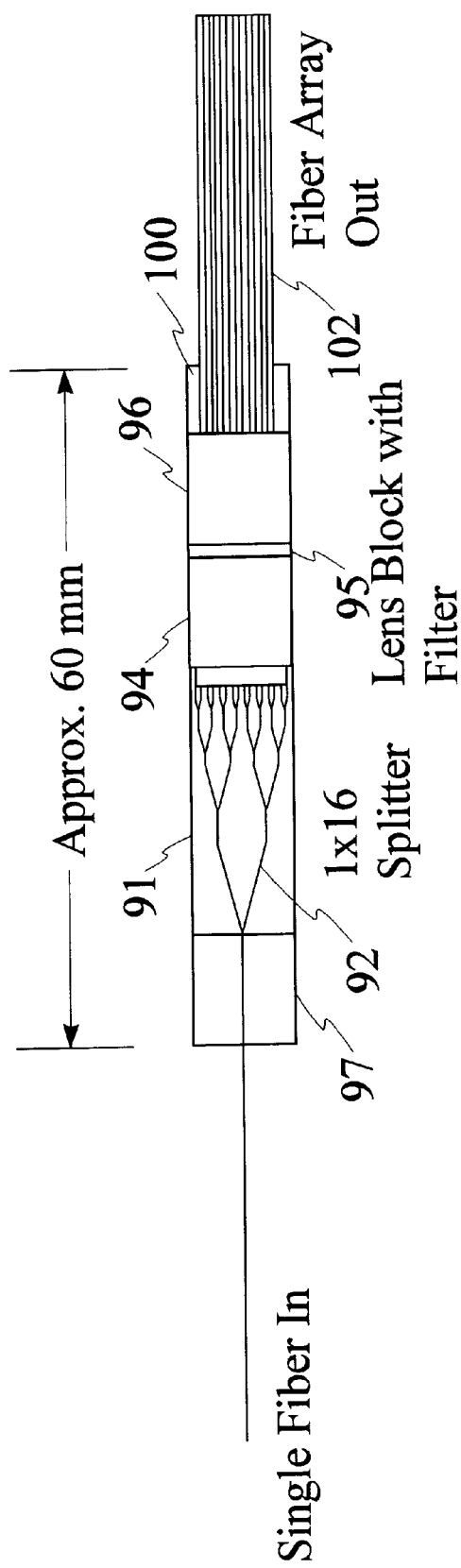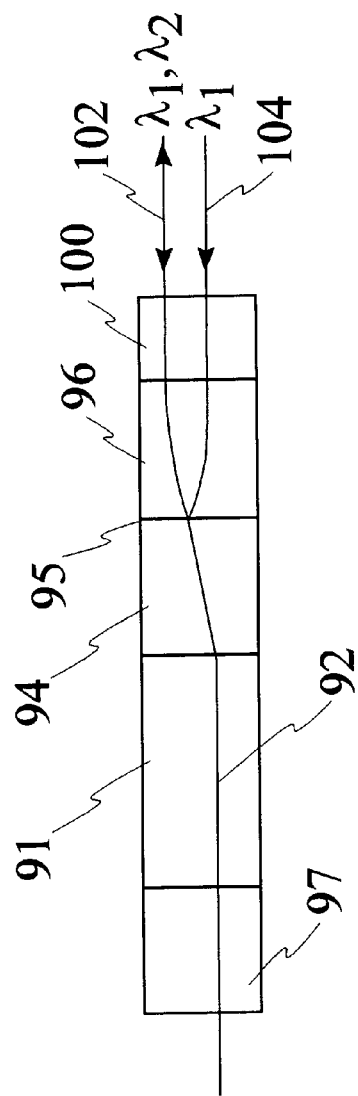
Fig. 9a
Fig. 9b

MULTI-PORT FIBER OPTICAL DEVICE

FIELD OF THE INVENTION

This invention relates to optical coupling technology, and more particularly relates to a multi-port optical device utilizing a lens and preferably a graded index lens.

BACKGROUND OF THE INVENTION

In optical fiber technology light signals are used in place of electrical signals to transmit information from one place to another. In the place of metal wires, transparent optical fibers carry light signals bearing the transmitted information.

One of the desired components in fiber optic technology is a low cost, high-performance coupler by which light signals sent on one optical fiber may be divided or split into light signals on several optical fibers. Conversely in some splitter/couplers light signals on more than one optical fiber may be combined into one fiber by such a coupler. This is a straightforward matter in the more common electrical technology. Wires may be spliced together to form multiple branches. Electrical signals sent along one wire will naturally propagate along all branches connected to the wire; and the converse situation is also true.

In fiber optic technology the dividing and combining of the light signals is a more complex. Connections must be made very carefully to ensure that the light signals are distributed to the fiber branches with minimum loss in intensity. Hence various schemes for optical couplers have been devised.

Heretofore, integrated optical waveguides, fused fiber optic star couplers, slab wave guides, active couplers (either acting as combiners or splitters), optical hologram or Fourier transform fiber optic splitters, and GRIN lens fiber optic splitters have been investigated. However, many of these approaches have had deficiencies of performance, such as in excess loss, loss deviation, frequency response, phase preservation and expandability of the splitting ratio, and costs, such as in fabrication of the splitter or interconnection with the rest of a fiber optic network.

Couplers are some of the most ubiquitous of all passive discrete optical components found in most optical communication systems. However until now, individual discrete couplers have been used. Thus, there is a need for a single device that will provide the function of multiple coupling devices in a single coupling element.

U.S. Pat. No. 5,371,816 in the name of Jing-Jong Pan, assigned to E-Tek Dynamics, Inc. proposes a 1:N optical coupler where N can be an arbitrary number such as 16 or greater. Although this invention appears to perform its intended function, it is rudimentary and limited in its functionality, simply allowing a signal propagating on an input fiber to be split into multiple output fibers or conversely allowing signals carried on a plurality of ports, to be combined on a single optical fiber.

In some instances splitters, couplers and mulitiplexors or demultiplexors are combined to form optical devices with desired functionality. However, as the number of input an output ports increase, the complexity, size and cost of these combined devices increases proportionally. And yet still further, such optical circuit may become unwieldy with regards to maintenance or repair as the number of ports increases.

For example, a splitter combiner/multiplexor that is to perform the function of splitting an optical signal of a first wavelength $\lambda 1$ into 16 sub-signals of wavelength $\lambda 1$, and combining each of these sub-signals with waveguides carrying a second wavelength $\lambda 2$, can be configured using a plurality of 1×2 splitters and 16 wavelength multiplexing filters for combining each of the 16 sub-signals of wavelength $\lambda 1$ with the 16 signals having the second wavelength $\lambda 2$. Of course, in such a device, now commercially available, the losses resulting from each coupling, for example each splitter and filter node, are considerable, and cumulative. Furthermore, the cost of providing a device that has plurality of 1×2 splitters and 16 WDM couplers is quite substantial. The size of such a device is also considerable and prognosis for easy maintenance and repair is not good.

Thus, it would be advantageous to have a low loss efficient, compact device that provided such functions as wavelength dependent or independent splitting, and/or coupling, or, splitting, and/or coupling in a wavelength dependent manner; Furthermore, it would be advantageous to have a device that could utilize a substantial region of the useful end surface area of a collimating lens, such as a GRIN lens to provide the splitting of optical signals. The embodiments of the instant invention endeavor to provide such functionality.

It is therefore an object of this invention to overcome the limitations of many of the prior art devices and to attempt to provide the desired functionality described heretofore.

It is a further object of the invention to provide an arrangement of linear arrays of optical fibres that are easily coupled with a lens and that can be easily tuned to perform optical alignment of pairs of waveguides by moving a single block housing linear arrays comprising pairs of waveguides.

STATEMENT OF THE INVENTION

In accordance with the invention, there is provided, a multi-port optical device comprising:

a first lens having at least two substantially linear arrays of at least 4 ports each at an end face thereof;

a second lens having a substantially common optical axis with the first lens and having at least 4 ports forming at least a third linear array, the third array of 4 ports being optically aligned with at least some of ports at the end face of first lens; and, an optical element interposed between the lenses for obtaining a desired function, wherein a first line intersecting each of the at least 4 ports of a first of the at least two substantially linear arrays is parallel to a second line intersecting each of the at least 4 ports of each of second of the substantially linear arrays, and wherein the first line and the second line are parallel to and spaced from a line intersecting the optical axis of the lens at its end face.

In accordance with the invention, there is further provided, a multi-port optical device comprising:

a first lens having at least a first substantially linear array having least 8 ports and a second substantially linear array having at least 8 ports at an endface thereof, an optical element at an opposite end face thereof for obtaining a desired function, the at least 8 ports of the first substantially linear array being optically aligned with the at least 8 ports of a second linear array, wherein a first line intersecting each of the ports of the first substantially linear array is parallel to a second line intersecting each of the ports of each of the ports of the second substantially linear array, and wherein the first and second lines are spaced from and are parallel to a third line intersecting the optical axis of the lens at its end face, the third line being substantially orthogonal to the optical axis of the lens.

In accordance with another aspect of the invention, a multi-port optical device comprising:

a first GRIN lens having a centrally disposed optical axis;

a pair of linear arrays of opposite optical waveguides having ends contained within a block, an end face of each of the waveguides being substantially coplanar with the end face of the block about each waveguide end, the waveguides being optically coupled with the GRIN lens, such that a point defined to be the centre of a parallelogram having the linear arrays as two of its opposite sides, is coincident with the optical axis of the GRIN lens.

Advantageously, this invention provides complex functionality using very few components, by taking advantage of currently available optical fibre arrays, and symmetrical properties of optical lenses, and preferably GRIN lenses. Further advantageously, this invention allows bulk optical components such as GRIN lenses and optical fibres to be combined with monolithic waveguide technology in a new and unexpected manner, whereby an array of waveguides disposed within a monolithic waveguide chip can be optically coupled with one or more linear arrays of waveguides such as optical fibres via lensing techniques that utilize a region of the lens, heretofore not utilized in this manner. As a result of this integration of technologies, the number of components is substantially reduced from those required before realizing similar functionality.

BRIEF DESCRIPTION OF THE DRAWINGS

Exemplary embodiments of the invention will now be described in conjunction with the drawings, in which:

FIG. 5 is a detailed illustration of an embodiment of a having a WDM filter interposed between a pair of lenses in accordance with this invention;

FIG. 5a is an end view of one of the lenses shown if FIG. 5 having two linear arrays of ports as viewed along the line 5a—5a;

FIG. 5b is an end view of another of the lenses shown in FIG. 5 having a single linear array of ports as viewed along the line 5b—5b;

FIG. 9a is a top view of an optical coupler in accordance with this invention having the functionality of the prior art coupler shown in FIG. 6;

FIG. 9b is a side view of the optical coupler shown in FIG. 9a;

DETAILED DESCRIPTION

Figure 1:
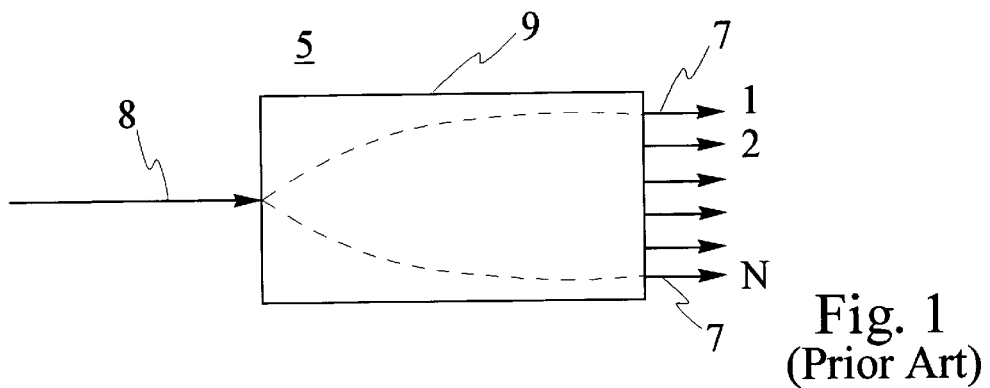
FIG. 1 is side view of a prior art optical coupler having an input port at a first side of a GRIN (GRaded INdex) lens and a plurality of output ports at an output side of the GRIN lens.

In the following description it is understood that some same elements shown in different figures are assigned same reference numerals. In the embodiments described hereafter, an exemplary 0.25 pitch GRIN (GRaded INdex) lens is shown of the type produced under the trade name "SELFOC"; the mark is registered in Japan and owned by the Nippon Sheet and Glass Co. Ltd. Rod lenses of this type are most convenient for coupling with optical waveguides, however this invention is not limited in scope to use with GRIN lenses.

Referring now, to FIG. 1 the general structure and operation of a 1.times.N fiber optic coupler 5 is described in U.S. Pat. No. 5,371,816. The fiber optic coupler has a first optical fiber 8 fixed to one end of a GRIN (GRaded INdex) lens 9 along the optical axis of the lens. At the other end of the lens 9 and also centered about its optical axis is fixed a bundle of N second optic fibers 7.

In operation where the coupler 5 acts as a splitter, light from the first fiber 8 is split and is transmitted along each of the N second fibers 7. The coupler acts as a combiner where first and second fibers switch roles, i.e., light from any one of the N second fibers 7 is transmitted through the GRIN lens 9 to the first fiber 8. The fiber 8 thus combines the signals from the fibers 7; the coupler acts as a combiner.

Figure 2A:
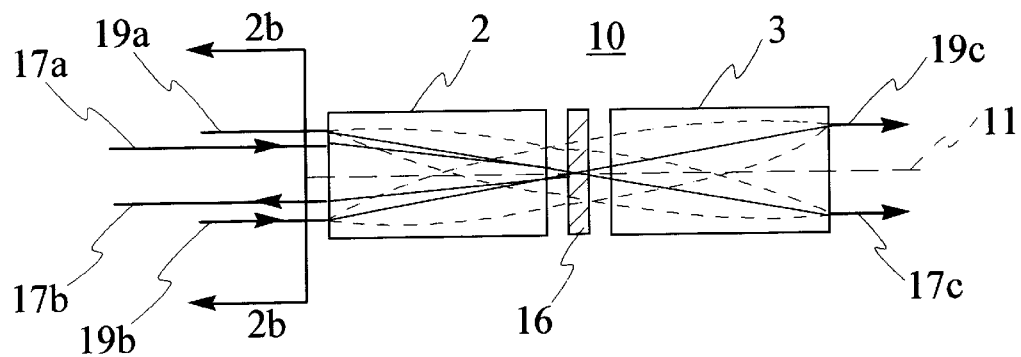
FIG. 2a illustrates a prior art top view of an optical coupler/splitter.
Figure 2B:
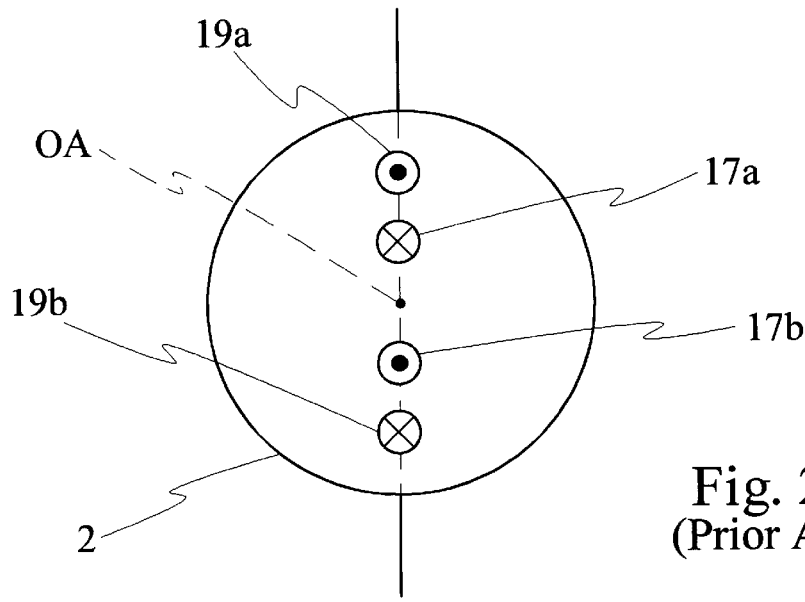
FIG. 2b illustrates a prior art cross sectional side view of the optical coupler/splitter shown in FIG. 2a taken along the line 2b—2b.

Turning now to FIGS. 2a and 2b, an optical coupler 10 is shown having an optical element in the form of a splitter filter 16 interposed between collimating inwardly facing ends of a first quarter pitch GRIN lens 2 and a second quarter pitch GRIN lens 3. The term optical port referred to hereafter shall be understood to be a predetermined location and/or coupling at a lens end face for launching or receiving light from in the form of an optical signal.

The first GRIN lens 2 is shown having an input end having input ports 17a and 19a, and a collimating output end. The input end further includes output ports 17b and 19b. Since the refractive index of the lens 2 is symmetrical about its optical axis 11 (shown by a dotted line through the center of the lens), pairs of ports are positioned symmetrically about the optical axis 11 such that input port 17a and output port 17b are equidistant from, and on opposite sides of the optical axis 11. Input ports 19a and output port 19b are more distant from the optical axis 11 and are similarly equidistant from it. By providing an at least partially reflecting optical element 16 and ensuring symmetry about the optical axis, a signal launched into port 17a, will reflect from the splitter filter 16 and back into output port 17b. Similarly, a signal launched into port 19a will reflect into port 19b. If the collimating GRIN lenses 2 and 3 are matched, having a similar refractive index profile, and if they share a common optical axis, output signals launched into the input ports 17a and 19a, not reflecting back to 17b and 19b respectively, will exit the output ports 17c and 19c respectively on the output (non-collimating) end of the second GRIN lens 3. Input port 17a and output port 17c are also substantially equidistant from the optical axis. 19a and 19c have a similar relationship. In the embodiment of FIG. 2a, optical element 16 described heretofore as a splitter filter 16, may be any at least partially reflecting, partially transmitting discrete optical element, or coating applied to an end of one of the lenses. Furthermore, it may have properties that are dependent upon the wavelength of light incident upon the filter, or, it may have properties that vary with incident angle or incident position on the element. The filter may be an attenuating filter a bandpass filter or a wideband splitter filter.

Figure 3:
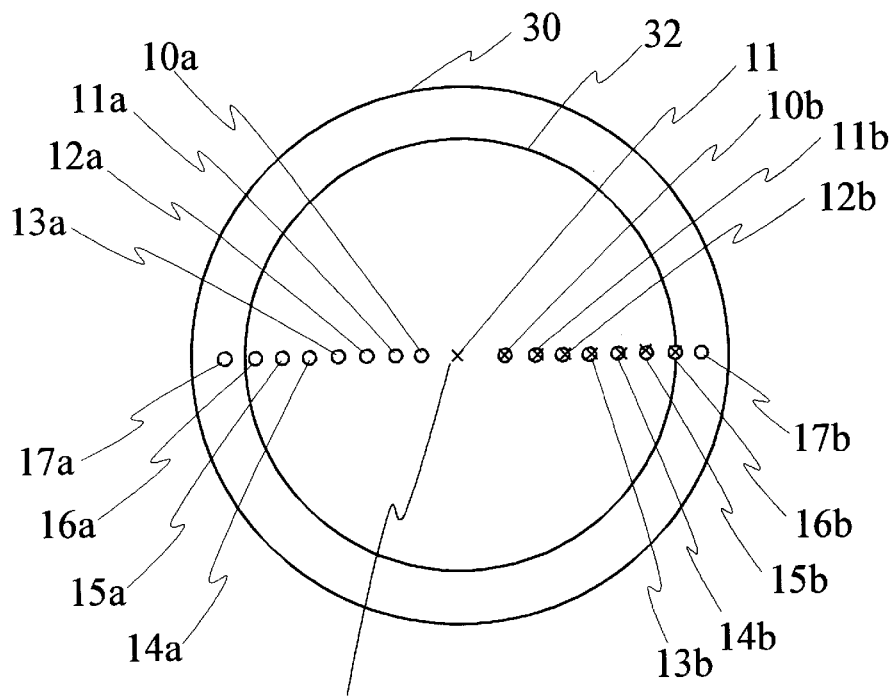
FIG. 3 is a end view of a multi-port optical coupler/splitter similar to the one shown in FIGS. 2a and 2b having a greater number of ports.

In FIG. 3, an end face of a GRIN lens 30 of a device 8 input ports and 8 output ports on a same end face, is illustrated. Not shown is an optical filter similar to filter 16 shown in FIG. 2a and another same GRIN lens complementary to the lens 30. Of course various other arrangements may be envisaged, however certain positional relationships must be maintained. For example, a transmitting port optically aligned with a receiving port is equidistant from the optical axis 11 and will be on opposite sides of the optical axis 11. For example, input port 10a is coupled through a reflective means 16 with output port 10b. Similarly input port 11a is coupled through the same reflective means to output port 11b, and so on, and input port 17a is coupled to output port 17b on the opposite side of the optical axis 11. All of these paired ports are equidistant from and on opposite sides of the optical axis. Furthermore, and not shown, ports 10c to 17c are coupled with ports 10b through 17b from the other compelmentary GRIN lens 30 (not shown).

Althrough the devices shown in FIGS. 2a, 2b, and 3 perform their intended function, of combining two wavelengths of light each originating at a distinct set of ports at a third set of ports, the optical arrangement is somewhat limited. For example, the input waveguides shown at the end face of the lens 30 in FIG. 3 are limited to being disposed along a radius, along one half of the end face, from the optical axis outward illustrated by ports 10a to 17a. Furthermore, for these ports to be optically coupled with a corresponding set of ports 10b to 17b, all of the ports must be equally spaced from the optical axis. One limitation to this design is that a substantial portion of the end face about the periphery of the lens is utilized. For ideal coupling of optical signals, and to obviate spherical aberration of the lens, it is preferred to use a more central region of the lens, confined within the region indicated by circle 32. The arrangement of FIG. 3 is limited, since only a length less than the radius of the lens can be used for either input or output optical ports, and large closely packed arrays of for example, 16 or 32 optical waveguides would not be practicably coupled to standard commercially available GRIN lenses having a diameter of about 2 mm.

Figure 4:
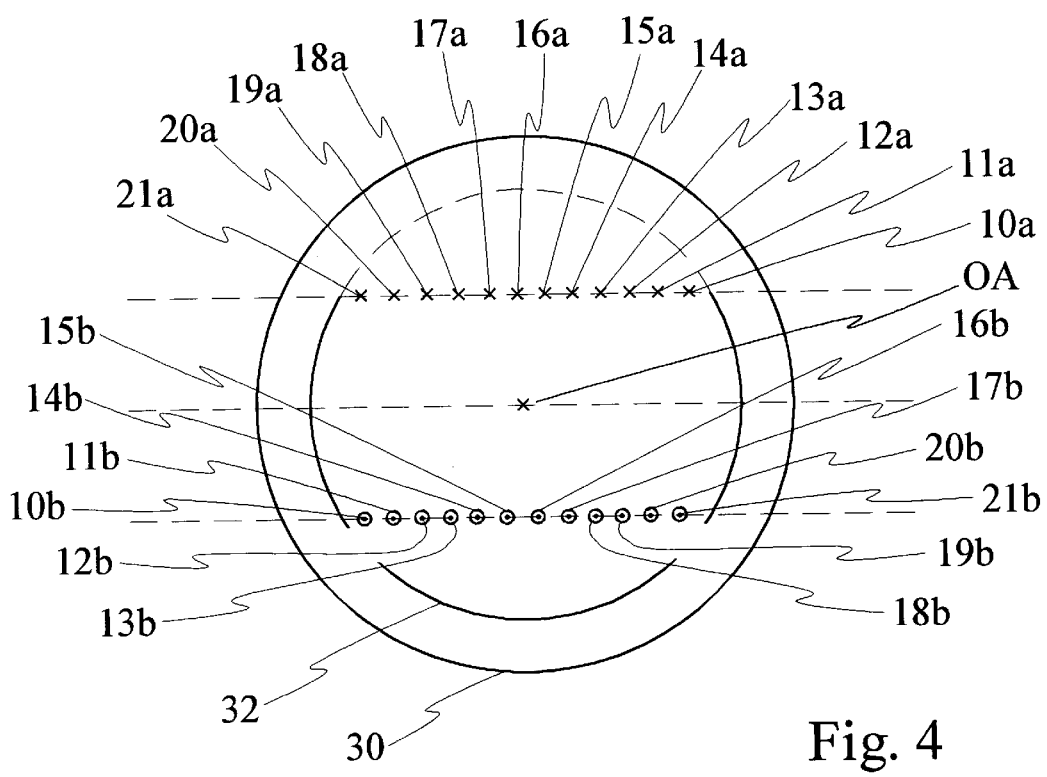
FIG. 4 is an end view of an alternative embodiment of an optical coupler in accordance with the invention having a GRIN lens and two parallel linear arrays of ports.

FIG. 4, in accordance with this invention, provides an alternative arrangement that allows a great number of input and output ports to be conveniently coupled to one another through a filter such as 16 shown in FIG. 2 and as well is compatible with commercially available ribbon fibre. A greater number of ports can be provided in the embodiment shown in FIG. 4 than FIG. 3 and, ribbon fibre blocks are available that conveniently provide ports as shown in FIG. 4. Here a line of input ports 10a to 21a are shown within the circle 32 forming a linear array indicated by the dotted line in the figure which passes through the ports. Spaced and parallel to the input ports 10a to 21a are a set of output ports forming a second linear array defined by ports 10b to 21b parallel to the first array of ports. Both linear arrays of ports are shown to be offset from the optical axis and parallel to a dotted line passing through the optical axis. Hence, the top array of input ports is optically coupled with the bottom array of output ports. FIGS. 5, 5a and 5b show a device in accordance with the invention, having only 4 input ports and 4 output ports at a same end, for the purpose of explanation of the optical circuit. In FIG. 5 an optical filter 16 is shown sandwiched between two GRIN lenses 50 and 53. Input signals having a first wavelength $\lambda 1$ are launched into a first linear array of ports 10a through 13a via optical fibres. These input signals are reflected by the filter 16 and couple into the second linear array defined by ports 10b through 13b, which are parallel to the first linear array of ports. A second group of signals having a wavelength of $\lambda 2$ are launched into waveguides and enter the lens 53 at ports 10c through 13c and pass through the filter 16 to couple into the optical fibres at ports 10b through 13b to combine with the signals having a wavelength $\lambda 1$. A more detailed view of the arrangement of the ports is shown in FIGS. 5a and 5b.

Figure 10:
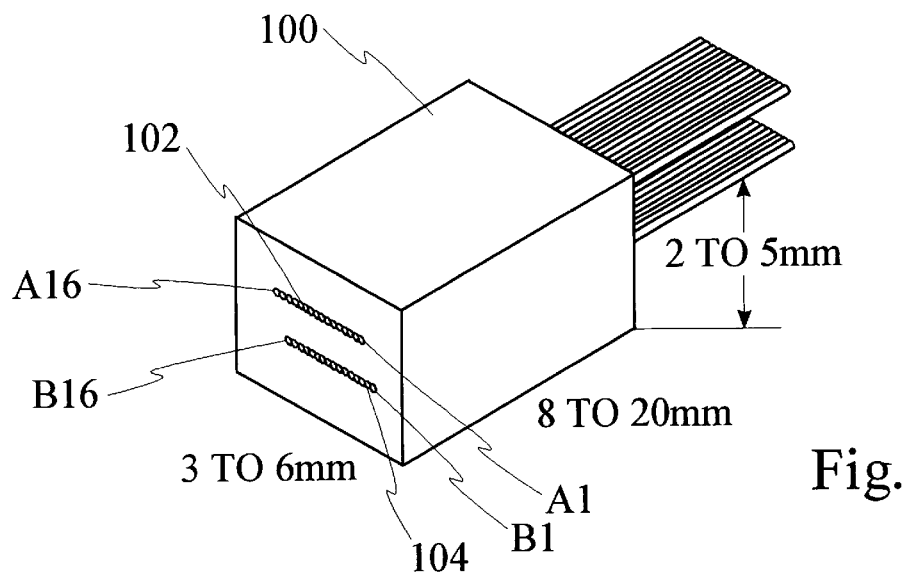
FIG. 10 is an illustration of two optical fibre linear arrays of waveguides secured within a block.
Figure 11:
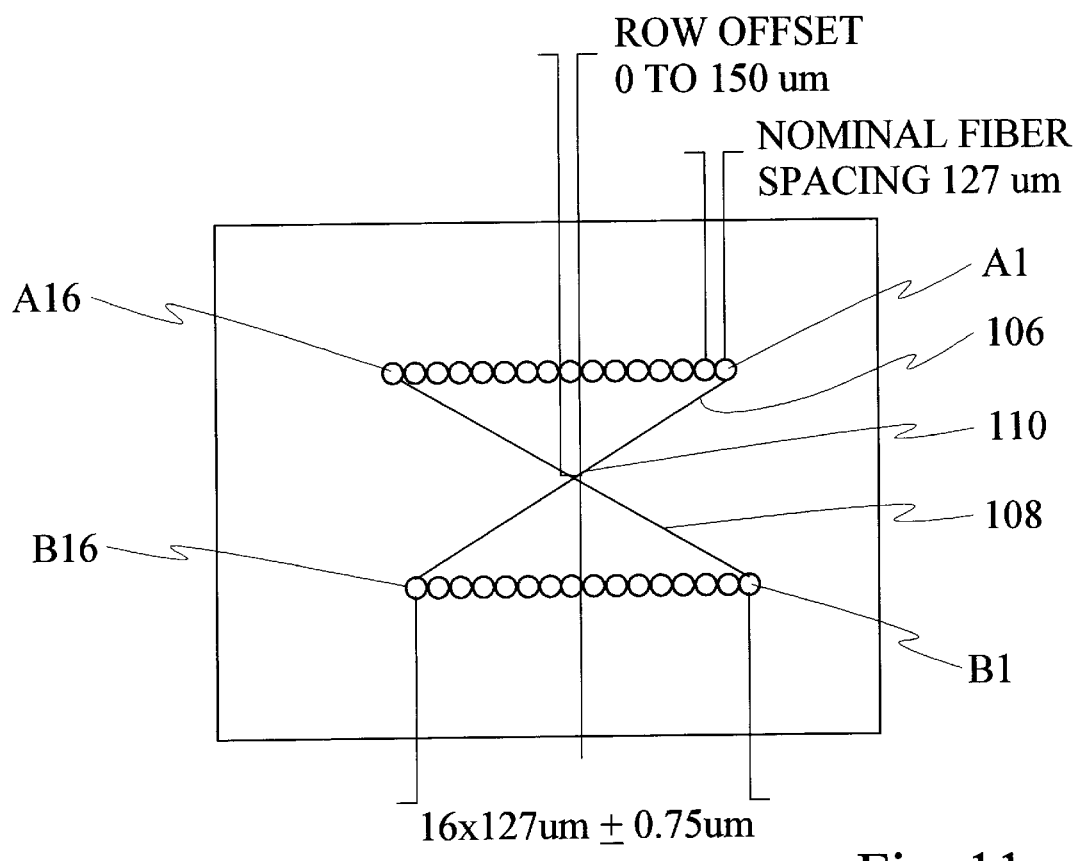
FIG. 11 is an end view of the block shown in FIG. 10.

The embodiments in accordance with the invention, shown in FIGS. 4, 5, 5a and 5b are most conveniently realized when used with an optical fibre block 100 such as the one shown in FIGS. 10 and 11. Two ribbons 102 and 104 of optical fibres are contained within the block 100. The ribbons 102 and 104 are linear parallel arrays of optical waveguides terminating at an end face of the block. In FIG. 11 two diagonal lines are shown connecting opposite ends of opposite arrays. A first diagonal is shown between fibre $A_1$ and $B_{16}$ and a second diagonal is shown between fibre $A_{16}$ and $B_1$. The intersection of these two diagonals is a point 110, which is coincident with the optical axis of the lens it is being coupled with to assist in alignment of the fibres with the lens. During assembly the block 100 can be coupled directly to an end face of a standard GRIN lens. Furthermore, after approximately aligning the intersection point 110 with the optical axis of the lens, further tuning may be done to both arrays at once, by shifting and rotating the block 100 while providing light beams to one of the arrays, while testing for optimum coupling by detecting the intensity at the other array. When the best position is located the block may be secured to the lens, or alternatively the relative positioning may be fixed. By having a block 100 with two arrays, and tuning in this manner, a significant time savings is afforded compared with individually tuning pairs of optical fibres.

Figure 12:
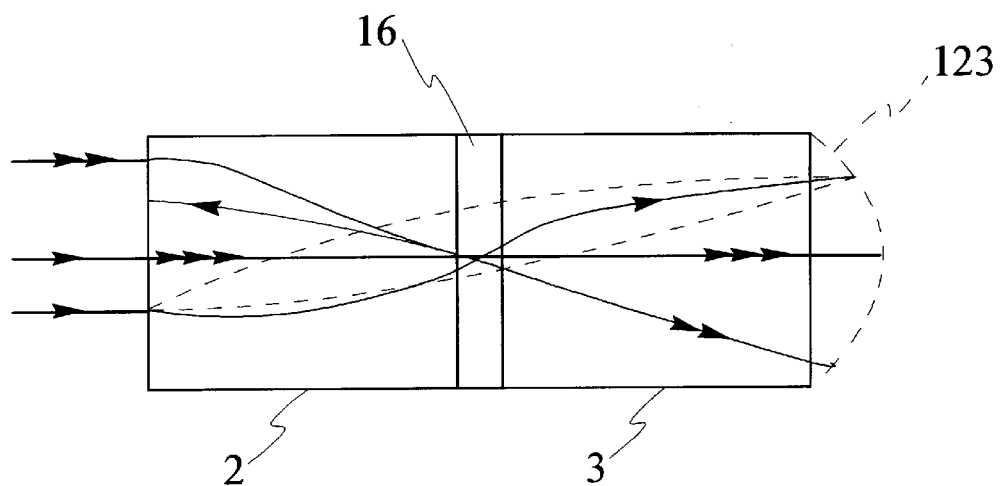
FIG. 12 is an illustration of light focusing about an end face along an arc next to a standard GRIN lensed filter.
Figure 13:
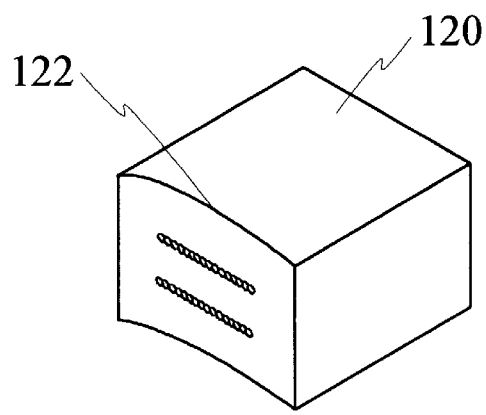
FIG. 13 is a block similar to the one shown in FIG. 10 having its end face polished for optimum coupling with a lens end face.

Referring now to FIG. 12, a GRIN lens pair is shown having an optical filter 16 disposed between the lenses 2 and 3. Here it is shown, somewhat exaggerated for the purpose of illustration, that the beams launched into the end face of the lens 2 do not focus along a straight line at an end face of the lens 3, but focus along a curved line. Hence, for optimum coupling, providing light collecting waveguides at the focus point for each pick-up waveguide along the curved path is preferred. FIG. 13 shows an embodiment wherein a block 120 has a curved face 122. This can be achieved by polishing a curve having a desired radius into a block having a flat end face.

Figure 6:
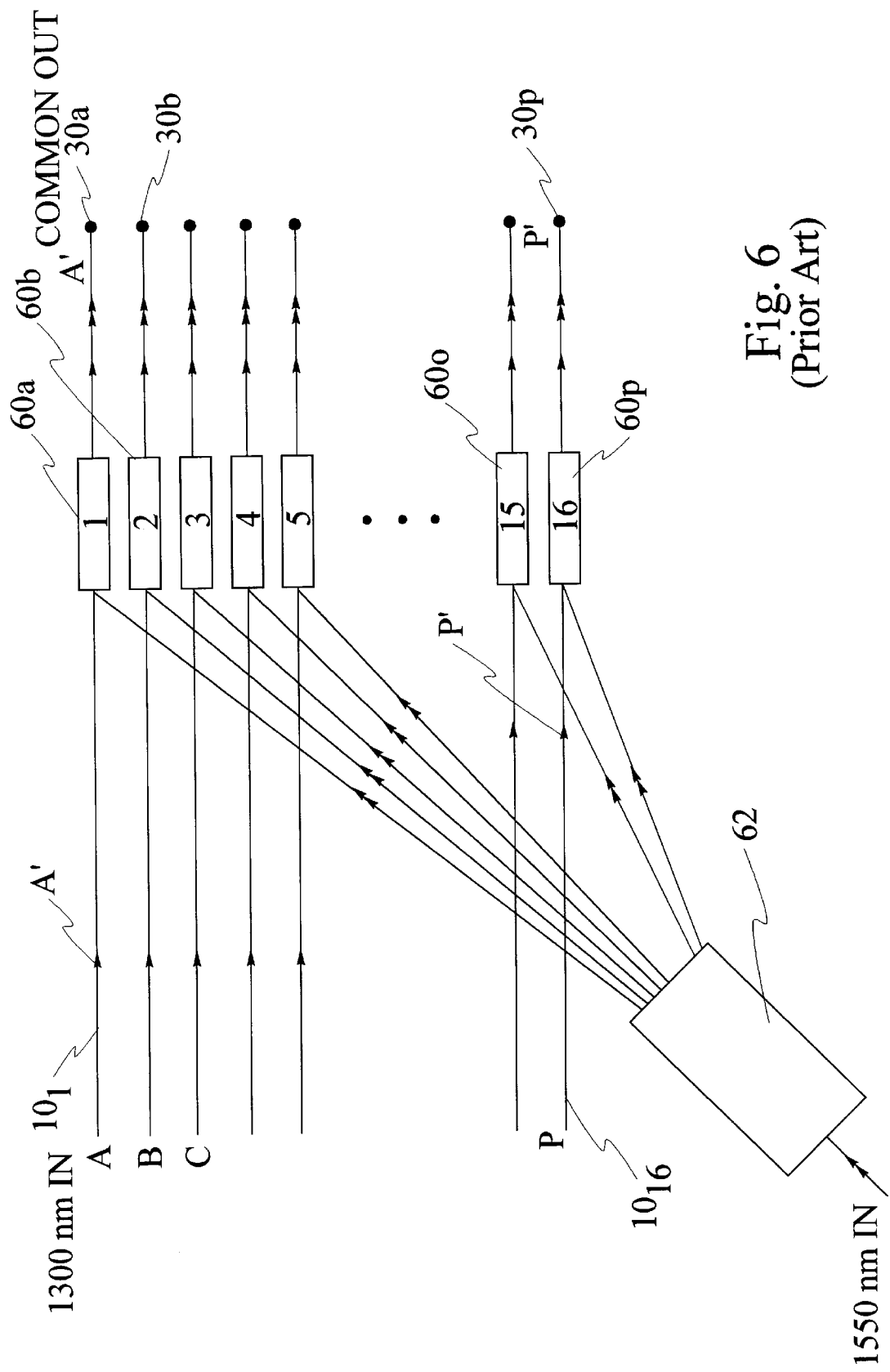
FIG. 6 is a prior art optical coupler for coupling one optical signal of a first wavelength with 16 other optical signals of a second wavelength.
Figure 8:
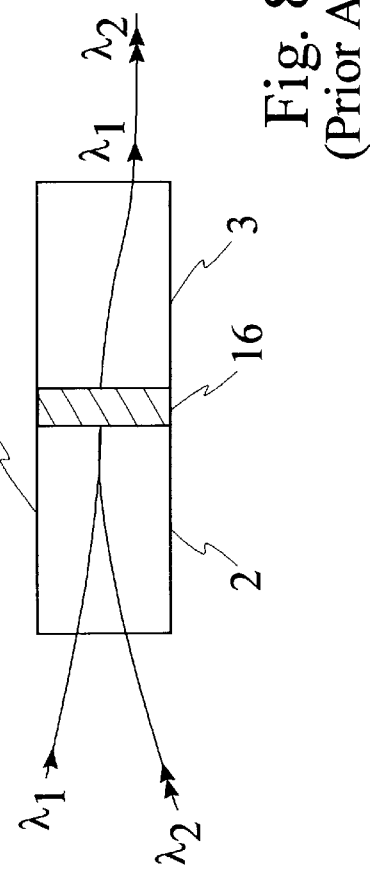
FIG. 8 is a prior art diagram of a GRIN lensed optical filter.

Referring now to FIG. 6, a communications system is shown wherein 16 optical fibres $10_1$ to $10_{16}$ (not all shown) provide bi-directional communication at a wavelength of 1330 nm between a transmitting end (at the left) and 16 subscribers 30a, 30b, 30c, to 30p (at the right). Optical multiplexers 60a to 60p are disposed intermediate the two ends of each of the optical fibres $10_1$ to $10_{16}$. The multiplexers can be of various known types, for example as is shown in FIG. 8, wherein each multiplexer 60a consists of a dichroic optical filter 16 sandwiched between two back to back collimating GRIN lenses 2 and 3.

Figure 7:
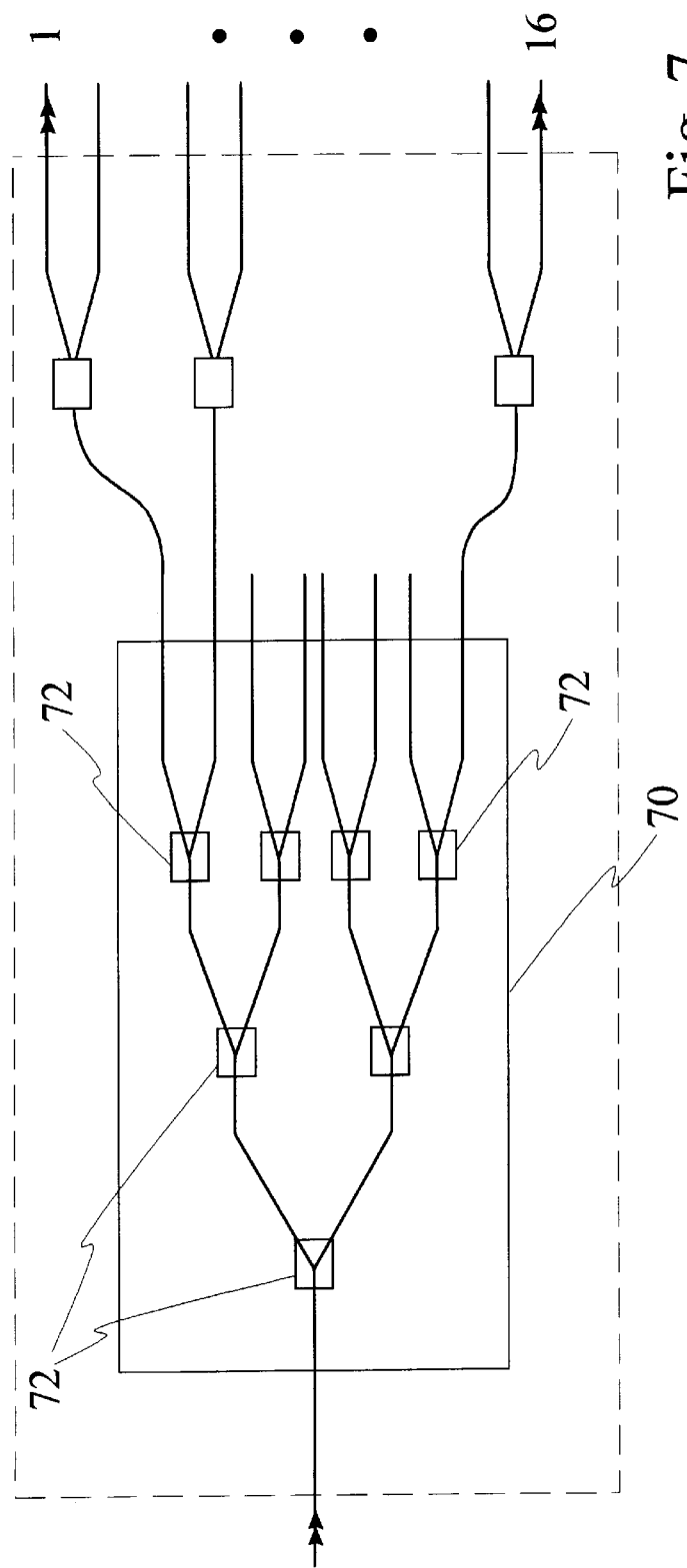
FIG. 7 is a detailed diagram of a prior art splitter network of the circuit of FIG. 6.

In operation, the circuit of FIG. 6 works in the following manner. Each of the 16 signals A', B', C', . . . P' are transmitted between subscribers and a single corresponding transmitting and receiving end A, B, C, . . . P respectively. A single 1550 nm signal to be multiplexed is divided by a 1 to 16 splitter 62 and the 16 branches carrying 1550 nm wavelengths are each directed to a different one of the 16 multiplexers 60a to 60p thereby providing a same 1550 nm signal having $\frac{1}{16}^{th}$ of the power of the original single signal to each subscriber. FIG. 7 is a more detailed diagram showing the 1:16 splitter 62. Here the 1:16 splitter is made from a plurality of 1:2 splitters forming a 1:8 splitter and the outputs of the 1:8 splitter are further divided by 1:2 splitters to form a 1:16 splitter. Of course other configurations are possible depending upon the components available.

Although the embodiment shown in the circuit of FIG. 6 performs its intended function, it requires a substantial number of components and is very bulky and costly to implement. It requires 16 multiplexors 60a . . . 60p and numerous splitters to realize a 1:16 splitter and a considerable amount of optical fibre for connections between the 16-splitter paths and the multiplexors 60a to 60p. Yet still further, signal losses at each optical fibre connection within the splitter and from the splitter ends to the multiplexors are considerable and to some degree cumulative.

An embodiment of this invention will now be described in accordance with FIGS. 9a and 9b, which provides the function of the circuit of FIG. 6 and is significantly more compact, having less signal loss, and requiring many fewer discrete components, and being less expensive to manufacture.

The circuit of FIGS. 9a and 9b includes a monolithic glass block 91 having a dividing network 92 of spaced waveguides disposed therein, via any well known technique that will provide a suitable refractive index difference between the waveguides region and the adjacent glass region serving as a cladding such as ion diffusion or ion exchange processes. Adjacent to the blocks 91 are two substantially quarter pitch graded index (GRIN) lenses 94 and 96 that provide a means of guiding, collimating and focusing light as required and as will be described. A wideband filter 95 designed to reflect light of wavelength 1330 nm and pass light of wavelength 1550 nm is disposed between the two GRIN lenses 94 and 96. The filter 95 can be deposited or coated directly onto the end face of one of the lenses 94 or 96 or alternatively can be deposited or coated onto a light transmissive substrate such as glass which is sandwiched between the lenses.

The dividing network of waveguides 92 within the waveguide block 91 is in the form of a 1:16 splitter having a single input optical fibre waveguide held in a holder 97. The network divides a single input waveguide into a branch network of 16 substantially parallel waveguides at another end with a spacing of 127 µm between adjacent waveguides core centres. Conveniently, these waveguides at the end of the block 91 adjacent the GRIN lens 94 are optically aligned with the linear array 102 at an end of the lens 96 via. The filter 95 is designed to allow light of wavelengths of about 1550 nm to pass therethrough and to reflect light of about 1300 nm.

In operation, the circuit shown in FIGS. 9a and 9b operates in the following manner. At an input outwardly facing end of the first block 97 an input signal having a wavelength of 1550 nm is launched onto the single optical fibre waveguide. The signal is subsequently divided by the splitter network and propagates along 16 waveguides toward the GRIN lens 94. Each of the sub-beams exiting the 16 end faces of the 1:16 splitter network propagate through the GRIN lens 94 and are directed toward the filter 95 as substantially collimated sub-beams. Upon being incident upon the filter 95, the 16 sub-beams are passed through the filter 95 to couple with the linear array of optical fibres 102 contained within block 100. The 16 sub-beams of light having a wavelength of 1550 nm then propagate into the waveguides 102. Light of having a wavelength of 1300 nm is simultaneously launched into the linear array of waveguides 104 and is reflected to the linear array of waveguides 102 so that both wavelengths couple together. This architecture conveniently allows the 1330 nm signal to pass bi-directionally from one end of the device to the other, (between waveguides 102 to 104) and at the same time provides a means of multiplexing the 1550 nm signal into each of the 16 subscriber's homes.

Although in this instance, the exemplary embodiment this circuit is limited to 16 subscribers, in practice it is limited by the number of waveguides that can conveniently be placed within a linear array at the end face of a lens.

One particular advantage of this circuit is that standard inter-waveguide spacing of 127 µm can be provided at one end of the block(s), compatible with commercially available linear array ribbon fibre for coupling signals into and out of the device.

Various other embodiments of this invention may be envisaged without departing from the spirit and scope of the invention. The optical element in the various embodiments may take the form of any optical element for changing a characteristic such as intensity, or direction of light incident upon it. It may be in the form of a wavelength dependent splitter, a wavelength independent splitter/filter, a splitter/coupler, an attenuator, or simply a means for reflecting an optical signal between two ports equidistant from the optical axis of a GRIN lens.

Figure 14:
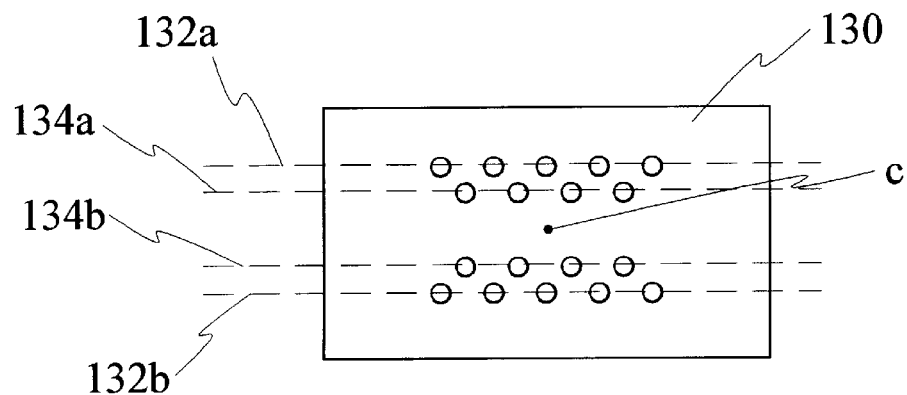
FIG. 14 is an end view of a block having two complementary pairs of linear arrays of waveguides, in accordance with the invention.

The block holding the arrays of waveguides can have more than two linear arrays of optically alignable waveguides. For example, in FIG. 14 a first linear array of optical fibres is shown defining an line 132a and a complementary second linear array 132b is shown equally spaced from the centre C of the block 130. Third and forth linear arrays defining the lines 134a and 134b are also shown, wherein the third array of waveguides is optically alignable with the fourth array via a lens.

Figure 15:
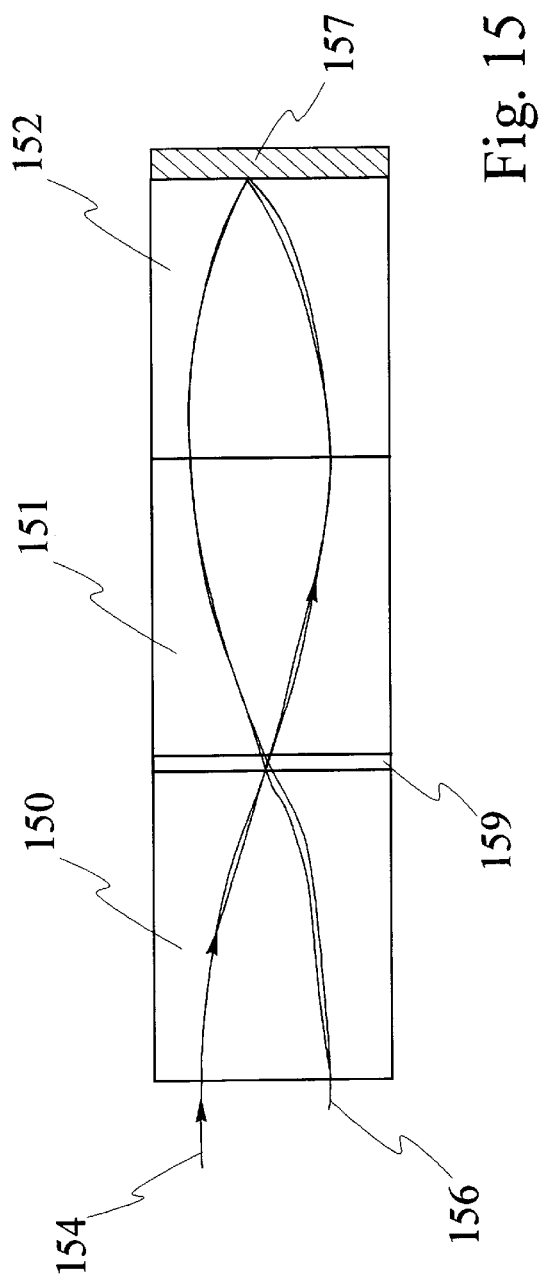
FIG. 15 is a side view of an arrangement of GRIN lenses shown for the purpose of illustration.
Figure 16:
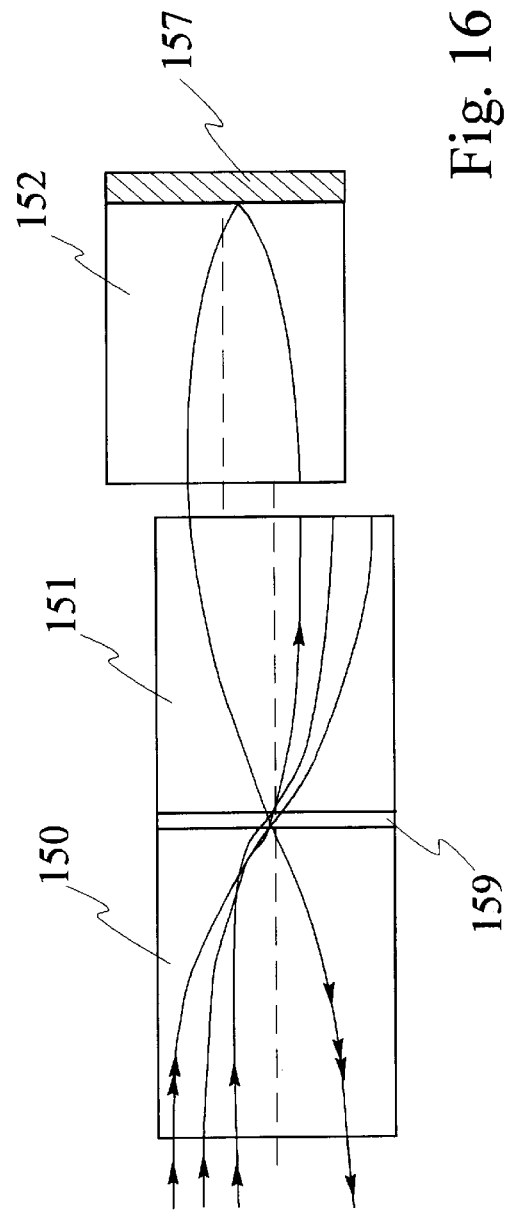
FIG. 16 is a side view of an arrangement of GRIN lenses that allows all input and output ports to be disposed on a same end of the device.

Turning now to FIGS. 15 and 16 an arrangement of GRIN lenses is shown that allows all input/output waveguides to be disposed at one end. For the purposes of illustration, FIG. 15 shows a beam 154 launched into a first lens 150 propagating through the first lens, a filter 159, a second and third lens 151 and 152 to be circulated backward via a mirrored surface 157 to an output port 156.

In FIG. 16 a similar arrangement is shown, however the lens 152 is shown having its optical axis offset from the two lenses 150 and 151. Advantageously, this allows all input an output waveguides to be disposed at a same end of the device. This is particularly important. Firstly, providing a hermetically sealed package of components is considerably easier when all ports are disposed at a single end of a device. Secondly, there is less mechanical stress on a package of optical components when all ports are disposed at a single end.

Figure 17:
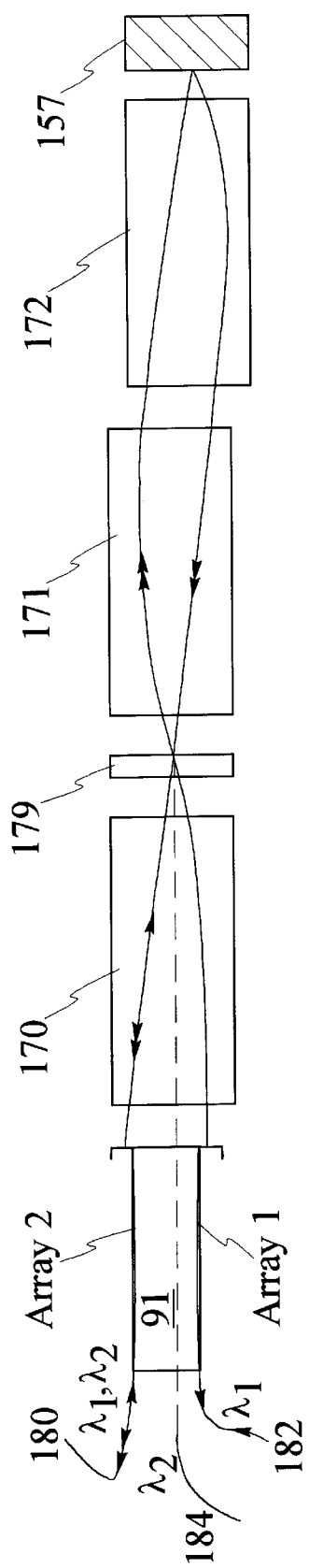
FIG. 17 is a side view of an alternative embodiment of the invention having a folded configuration; and, FIG. 18 is a perspective view of the embodiment shown in FIG. 17.

FIG. 17 illustrates an embodiment of this invention wherein the input output linear arrays 180 and 182 and the single input waveguide 184 are disposed at a single end of the device. From the left to the right end of the device there is a waveguide block 91 having a dividing network as is shown in FIG. 9a. The two linear arrays of waveguides 180 and 182 are disposed on the top and bottom of the waveguide block respectively, the block being optically coupled with a first lens 170. An optical filter 179 is designed to reflect light of a wavelength λ1 and is designed to pass light of a wavelength λ2. Two collimating lenses 171 and 172 are offset from each other and the lens 172 has a reflective surface such as a mirror 157 at an end. These lenses are disposed to guide the beams from the divider network of the block 91 back to ports of the array 180 for combination with the light of wavelength λ1. This embodiment is particularly well suited to being disposed within a hermetically sealed package. This embodiment provides the same functionality as the embodiment of FIG. 9a.

Figure 18:
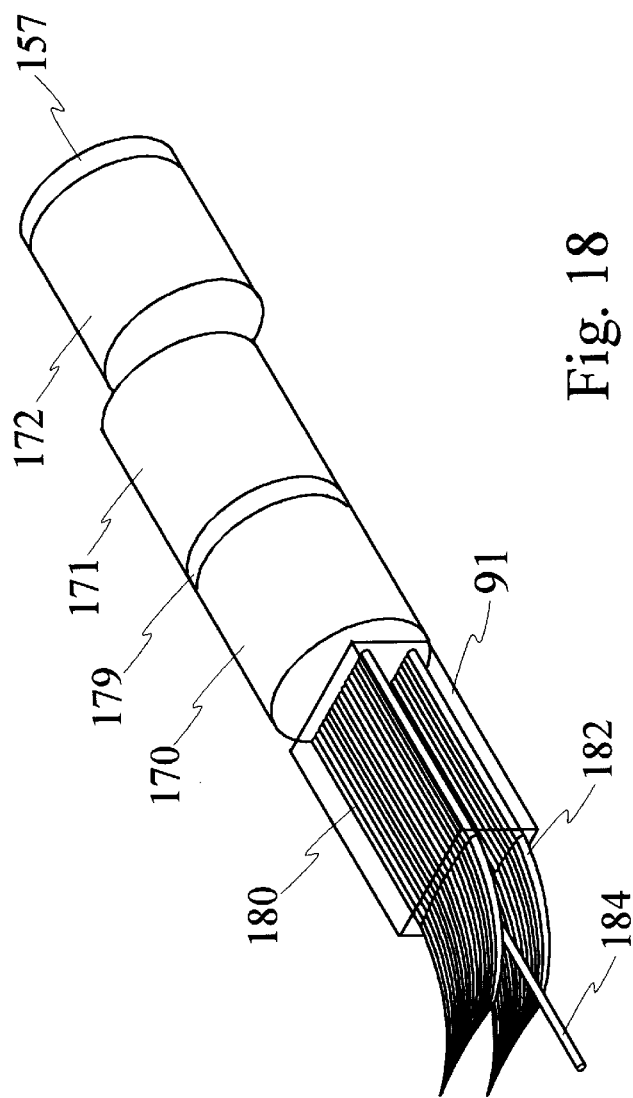

FIG. 18 illustrates the same embodiment shown in FIG. 17 in perspective view.

Of course, numerous other embodiments may be envisaged without departing from the spirit and scope of the invention.

What we claim is:

1. A multi-port optical device comprising:
   a first lens having at least two substantially linear arrays of at least 4 ports each at an end face thereof;
   a second lens disposed in optical alignment with the first lens and having at least 4 ports forming at least a third linear array, the third array of 4 ports being optically aligned with at least some of ports at the end face of first lens; and, an optical element interposed between the lenses for obtaining a desired function, wherein a first line intersecting each of the at least 4 ports of a first of the at least two linear arrays is parallel to a second line intersecting each of the at least 4 ports of each of second of the linear arrays, and wherein the first line and the second line are parallel to and spaced from a line intersecting the optical axis of the lens at its end face.

2. A multi-port optical device as defined in claim 1, wherein the first linear array of ports is optically aligned with the second linear array of ports via the first lens and wherein the first and second lenses are GRIN lenses having a common optical axis.

3. A device as defined in claim 1, wherein the optical element is at least partially reflective to light.

4. A device as defined in claim 1, wherein the optical element is an optical filter.

5. A device as defined in claim 4 wherein the optical element is in the form of a coating applied to an end face of one of the lenses.

6. A device as defined in claim 4, wherein one of the at least two linear arrays of at least 4 ports is optically coupled with a linear array of at least 4 waveguides on a monolithic waveguide block.

7. A multi-port optical device comprising:
   a first lens having at least a first substantially linear array having least 4 ports and a second substantially linear array having at least 4 ports at an endface thereof, an optical element at an opposite end face thereof for obtaining a desired function, the at least 4 ports of the first substantially linear array being optically aligned with the at least 4 ports of a second linear array, wherein a first line intersecting each of the ports of the first substantially linear array is parallel to a second line intersecting each of the ports of each of the ports of the second substantially linear array,
   and wherein the first and second lines are spaced from and are parallel to a third line intersecting the optical axis of the lens at its end face, the third line being substantially orthogonal to the optical axis of the lens; and, a second lens adjacent the optical element, the second lens having a linear array of ports at an end face thereof, optically aligned with one of the first and second substantially linear arrays having at least 4 ports.

8. A multi-port optical device as defined in claim 7 further comprising a second lens adjacent the optical element, the second lens having a linear array of ports at an end face thereof, optically aligned with one of the first and second substantially linear arrays having at least 4 ports, a line intersecting the linear array of ports at the second lens end face being spaced from a point at the end face of the lens defining the optical axis of the second lens.

9. A multi-port optical device as defined in claim 8, wherein the first and second lenses are GRIN lenses.

10. A multi-port optical device as defined in claim 8 further comprising a monolithic waveguide block optically coupled to and end face of the second GRIN lens, such that a linear array of waveguides on the monolithic device is optically aligned with one of the substantially linear arrays of ports at the first GRIN lens end face.

11. A multi-port optical device as defined in claim 10, wherein the monolithic waveguide block comprises a splitter for splitting at least one waveguide into a linear array of at least 4 waveguides, such that a signal launched onto the at least one waveguide is split into at least 4 signals onto the linear array of at least 4 waveguides.

12. A multi-port optical device as defined in claim 11 wherein the device is for performing the function of multiplexing an optical signal launched into the at least one waveguide on the monolithic waveguide block, onto one of the first and second arrays of ports at the end face of the first GRIN lens.

13. A multi-port optical device as defined in claim 12, wherein the optical filter disposed between the first and second GRIN lenses is for reflecting a group of signals launched into the first array of at least 4 ports to the second array of at least 4 ports and for combining signals present on the at least 4 waveguides on the monolithic waveguide block with the group of signals reflected to the second array of ports at the first end face of the first lens to be multiplexed therewith.

14. A multi-port optical device comprising:
   a first GRIN lens having a centrally disposed optical axis;
   a pair of linear arrays of optical waveguides having ends contained within a block, an end face of each of the waveguides being substantially coplanar with the end face of the block about each waveguide end, the waveguides being optically coupled with the GRIN lens, such that a point defined to be the centre of a parallelogram having the linear arrays as two of its opposite sides, is coincident with the optical axis of the GRIN lens and a second GRIN lens optically coupled with the first GRIN lens to receive light from one of the waveguides within the block.

* * * * *